Nov. 10, 1964          H. P. BORIE, JR          3,156,132
REMOTE CONTROL MECHANICAL ACTUATOR
Filed May 24, 1961          3 Sheets-Sheet 1

INVENTOR.
H. PETER BORIE, JR.
BY
Fay & Fay
ATTORNEYS

Nov. 10, 1964 H. P. BORIE, JR 3,156,132
REMOTE CONTROL MECHANICAL ACTUATOR
Filed May 24, 1961 3 Sheets-Sheet 2

INVENTOR.
H. PETER BORIE JR.
BY
*Fay & Fay*
ATTORNEYS

INVENTOR.
H. PETER BORIE JR.
BY
*Fay & Fay*
ATTORNEYS 3,156,132
REMOTE CONTROL MECHANICAL ACTUATOR
Henry Peter Borie, Jr., 2093 Harwitch Road,
Columbus, Ohio
Filed May 24, 1961, Ser. No. 112,336
4 Claims. (Cl. 74—424.8)

This invention relates to a mechanical actuator of the type which produces mechanical motion at a location remote from the input force and has for an object the provision of an improved lightweight flexible mechanical actuator for providing either a linear or rotary output at a romote location from the opposite input power source.

Under some conditions it may be desirable to provide both a linear and a rotary output, i.e., the output would have a linear motion and upon completion of a certain amount of travel, the output would rotate in either direction.

The present invention is particularly applicable to installations where it is necessary to transmit a force along a circuitous or serpentine path to a location remote from the operator and the input source of power. While flexible shafts have heretofore been used for such remote control applications, they have left much to be desired. They have included large friction losses which in turn have required large power input sources to obtain the desired output. This has, in turn, increased the weight of the drive motors which supply the power for such devices and has made it difficult to obtain close control of the operated device at the remote location. With flexible shafts of the prior art linear push-pull type, a second mechanism has been required to convert the linear motion to rotary motion. The present invention inherently provides for conversion of linear motion to rotary motion and vice-versa without the need of a second mechanism. Heretofore when conventional flexible shafts were used to produce rotational movement, they had the disadvantage of having a large amount of torsional windup.

The present invention has, to a substantial degree, eliminated the foregoing disadvantages. It utilizes a flexible shaft or cable having wire wound on its surface in the shape of a helix and which is adapted to cooperate with an anti-friction nut means to provide relative movement therebetween. This flexible force transmitting device, by reason of its extremely low internal friction, is particularly applicable to installations where long lengths of flexible cable are required due to the remote location of the operator. The flexible cable may be as long as twenty to fifty feet and by reason of the low-friction losses in the device, the power source may be small, such for example, as a small motor. Thus, the device is compact and its overall weight is likewise small so it is particularly suited for use in remote control of aircraft parts and as a portable unit, such as a portable charge seating mechanism.

More particularly, the present invention provides a remote-controlled mechanical actuator device including an elongated cable means having a flexible core and a wire wound around the core in the shape of a helix, the turns of the wire helix being spaced apart one from the other. A recirculating ball nut means is disposed on the cable means and includes a housing and a plurality of ball members contained therein. The ball members are adapted for recirculation through the housing while carried by the spaced turns of the wire helix. There is also provided means restraining one of the elongated cable means and nut means from axial movement while permitting axial movement of the other.

An object of this invention is to provide an improved means of converting either linear or rotary input motion to an output which is the opposite of that.

A further object of the invention is to take an input source of rotary motion and convert it to linear motion by means of a ball and recirculating nut to a flexible cable for use in transmitting a force along a circuitous path.

A further object of the invention is to convert an input source of linear motion to a rotary motion at a remote location by causing linear motion of the cable to convert this by means of a ball and recirculating nut to rotary motion for performing some mechanical function at a remote location.

A further object of this invention is to convert rotary motion to linear motion by means of a ball and recirculating nut to perform work at a remote location at the end of a circuitous path and to clamp the cable to the rotary drive force and rotate the cable a limited amount to perform a further clamping or unclamping operation.

A further object of this invention is to provide a device which can convert rotary motion to linear motion by means of a ball and recirculating nut and cause this linear motion to be actuated down a cable to some remote location where a force can be applied and upon completion of this applied force a rotary motion may be undertaken if desirable to uncouple or couple a load thereto before reversal takes place.

For a more detailed disclosure of the invention, and for further objects and advantages thereof, reference is to be had to the following description taken in conjunction with the accompanying drawings in which.

Figure 3:
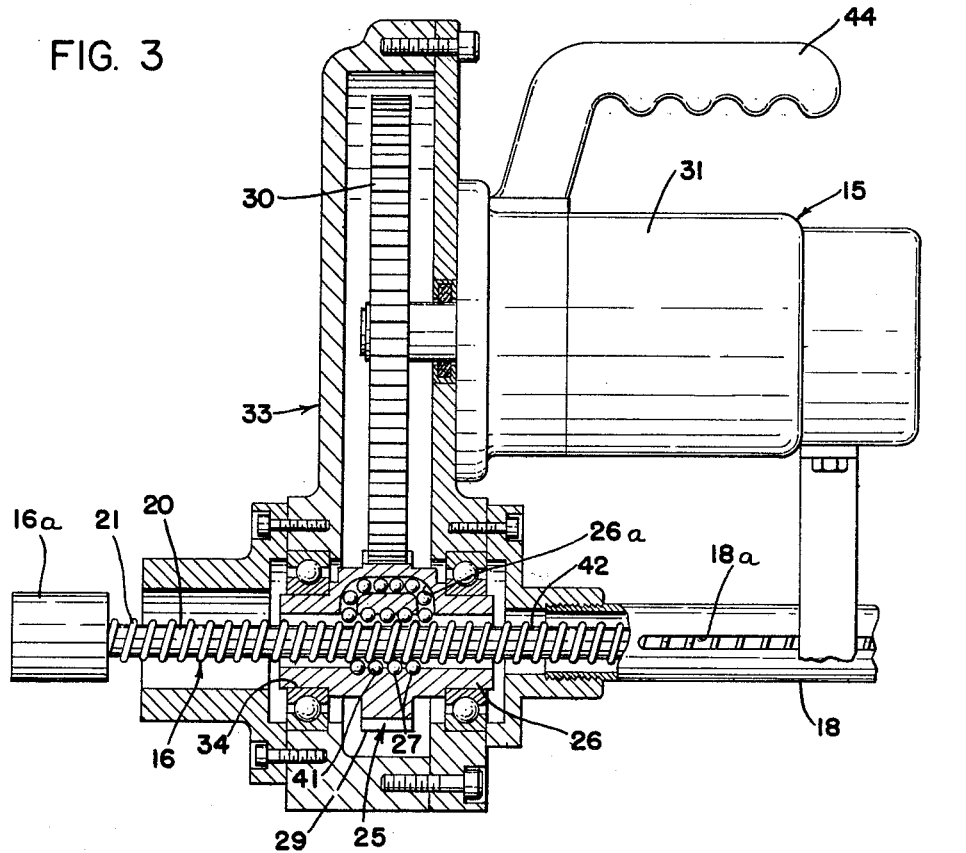
Figure 4:
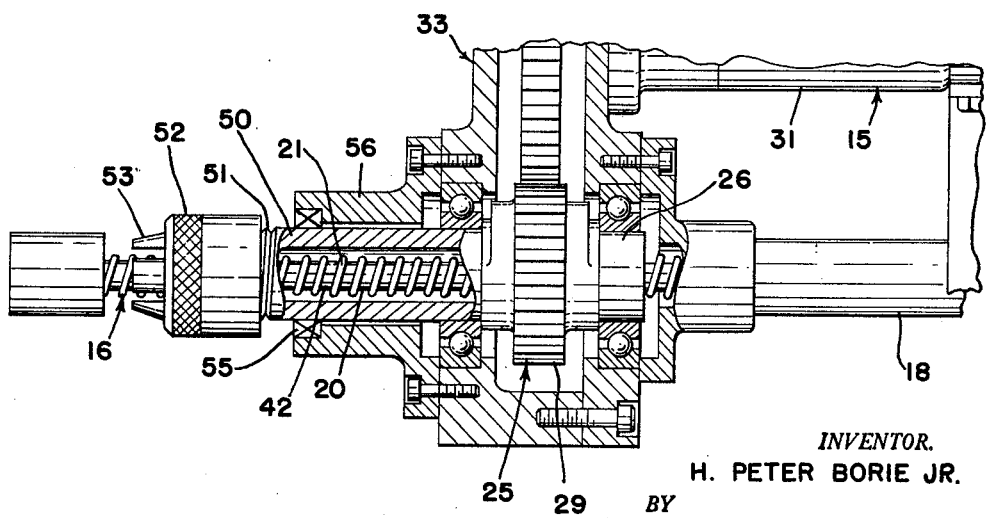
Figure 5:
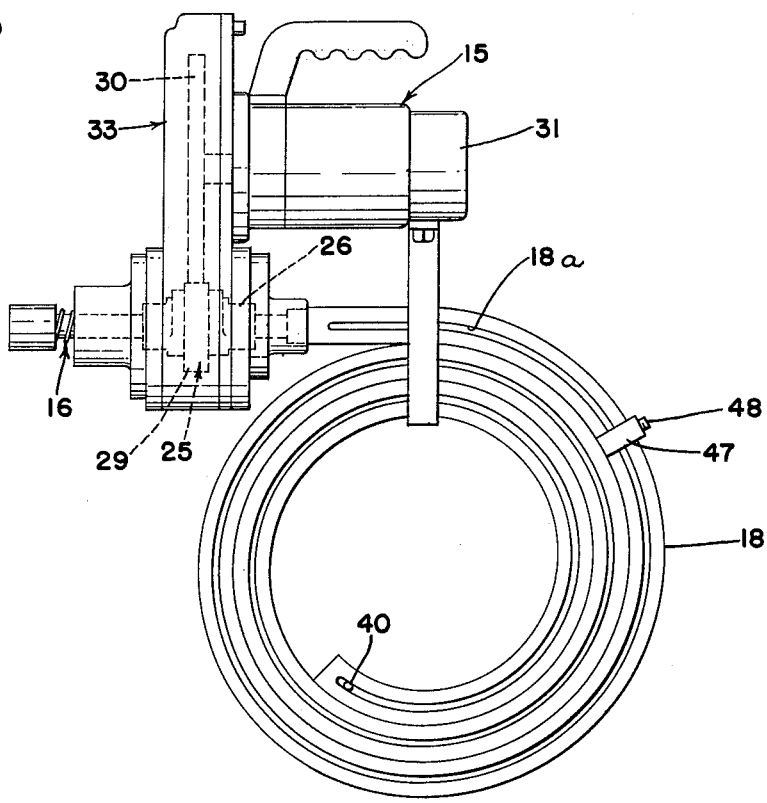
Figure 6:
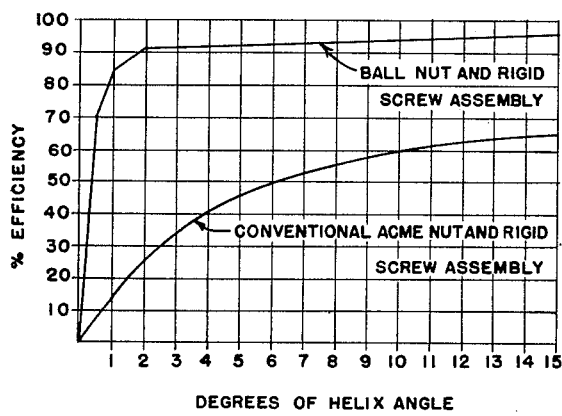

FIG. 3 diagrammatically illustrates the invention as applied to a portable charge seating mechanism requiring a relatively long linear output motion;

FIG. 4 is a fragmentary modified view of FIG. 3 with clamping means providing for a version of rotary to linear motion which may be stopped and frictionally grabbed for additional rotary movement;

FIG. 5 is a view of my new and improved charge seating mechanism for converting rotary to linear actuation; and FIG. 6 is a diagrammatic view of the efficiencies of a conventional ball nut and rigid screw assembly compared with that of a conventional Acme nut and rigid screw assembly.

Figure 1:
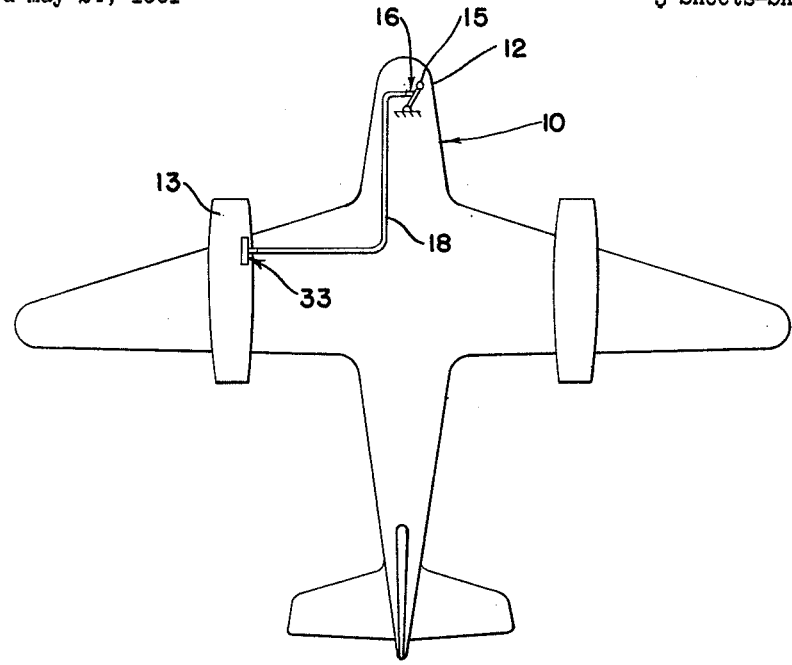
FIG. 1 is a diagrammatic view illustrating the invention as applied to a control system of an aircraft where a relatively short linear input motion produces a rotary output motion at a remote location.

Referring now to FIG. 1, the present invention has been illustrated in connection with the control of some function of an engine 13 on aircraft 10. The input is normally applied at the cockpit 12 of the aircraft 10 while the engine 13, which is being controlled, is a substantial distance therefrom, for example on the wing of the aircraft 10, a distance which may be on the order of fifty feet or more. The remote controlled mechanical actuator lever 15 of the present invention includes a flexible cable 16, one end of which is connected to a lever 15 located in the cockpit 12, while the opposite end of the cable 16 is located at the engine 13. It will be noted that the cable 16 is of substantial length and makes numerous bends or turns between the input and output ends thereof. The cable 16 passes through a conduit 18 and is held by brackets 19 (FIG. 2) which likewise includes numerous bends and turns and may be either flexible or rigid, since it need not move once it has been installed in the aircraft.

Figure 2:
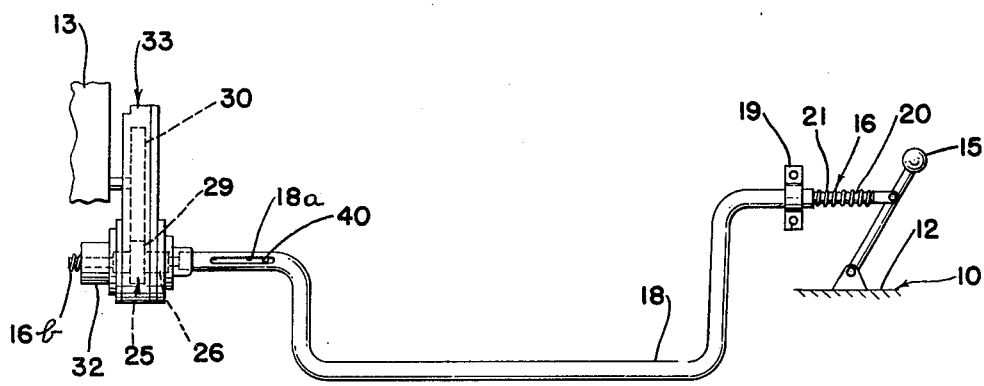
FIG. 2 is a fractional sectional view of the embodiment illustrated in FIG. 1.

The elongated cable 16 includes a flexible core 20, which is made from multiple strands of small diameter wire. A larger wire 21 is wound around the flexible core 20 in the form of a helix with the turns of the helix being spaced apart one from the other. Anti-friction nut means which has been illustrated in detail in FIG. 3 in the form of a recirculating ball nut 25 is disposed on the flexible cable 16 in FIG. 2. The recirculating ball nut 25 includes a housing 26 with the plurality of ball members therein. The ball members are adapted to be received between the spaced turns of the helical wire 21, and the housing 26 includes a passage 41 which permits the ball members 27 to recirculate therethrough. The outer surface of the housing 26 is provided with operating structure in the form of a gear 29 which rotates in response to the linear motion of cable 16. As illustrated in FIG. 2, the gear 29 is adapted to drive a mating gear 30 which in turn controls some function of the engine 13 (FIG. 1). The recirculating ball nut 25 is supported on a frame 33 and an end of the housing 26 extends through a bearing opening 34 in the frame 35.

In order to keep the flexible cable 16 from rotating during its axial movement, a conduit 18 is provided with a slot 18a therein which is adapted to receive one or more pins 40 which are affixed to the flexible cable 16. This is particularly desirable since the flexible cable 16 has a considerable torsional flexibility which would produce a large amount of backlash or torsional windup if it were permitted to rotate. An alternative method of preventing rotation of cable 16 is to extend the free end 16b of the cable 16 and to coil it up within a second piece of coiled conduit similar to the coiled conduit 18 in FIG. 5. The friction produced between the cable and the conduit will prevent cable rotation and the slot 18a, FIG. 5, can be eliminated.

Referring now to one embodiment of the invention, as shown in FIG. 3, the interior of the housing 26 of the recirculating ball nut 25 is provided with a helical groove 41 corresponding to the helical spacing 42 between the turns of the helical wire 21. The groove 41 and the helical spacing 42 cooperate to define a helical passage extending lengthwise of the nut 25 and the flexible cable 16. The anti-friction balls 27 which are positioned in the helical passage interconect the cable 16 with the nut 25 so that relative rotation therebetween produces relative axial motion. As the nut 25 and spiraled round cable 16 rotate relative to each other, the balls 27 roll along the groove 41 and the spacing 42 between the turns of the helically wound wire 21 from one end of the nut to the other. The passage thus defined by the groove 41 and the spacing 42 is such length as to distribute the reactive forces over a substantial portion of the helical wire through point contact of each ball with the entire circumference of each turn of wire, thus minimizing any adverse tendency to deform one of the contacting members. Heretofore, all methods of driving a flexible cable have concentrated the load on only a small arcuate portion of each turn of the wire, often resulting in such undesirable deformation. The passage 26a permits the balls 27 to return to the opposite end of the nut 25 for recirculating through the endless path.

Backlash between the input lever 15 and the driven gear 29 may be controlled by utilizing two recirculating ball nuts mounted back-to-back on the flexible cable 16 and preloaded towards each other. This is a substantial improvement over utilizing an ordinary nut or pinion engagement with the helical wire on a flexible cable, since backlash in the latter arrangement is dependent entirely on the precision with which the gear is cut and the precision with which the helical wire is wound. Backlash has heretofore been a problem in a flexible drives of this type since it is extremely difficult to wound a helical wire so that the pitch will be uniform. The adverse effects of such non-uniformity have been, to a substantial degree, eliminated by the use of recirculating ball nuts in combination with the flexible spiral wound cables as disclosed in the present application.

While the arrangement illustrated in FIG. 1 shows the present invention as applied to moving a relatively long length of flexible cable through a relatively short distance, it is to be understood the present invention is likewise applicable to moving such long lengths of flexible cable through relative long distance. Referring to FIG. 3, the flexible force transmitting device 15 has been illustrated in the form of a portable unit suitable for charge seating and other nuclear applications. Since the device 15 is light in weight, it may be carried manually and thus the motor 31 may be provided with a suitable handle 44. When cable 16 is withdrawn from the passages in the nuclear device then cable 16 coils up inside conduit 18. In this application, the input is rotary and the recirculating ball nut 25 is adapted to be rotated by way of gear 30 from motor 31 to extend or retract flexible cable 16 into or from the conduit 18. The end of the flexible cable 16 is provided with a suitable connector 16a as shown in FIG. 3. When the device 15 is used for charge seating, the connector 16a will be adapted to receive a charge of material for seating in nuclear device. In this application the nuclear device is provided with a plurality of passages in the form of aluminum tubes which are built into the graphite moderator. In operation the device 15 is positioned at the opening of one of the passages. When the motor is turned on it causes cable 16 to be withdrawn from conduit 18, FIG. 3, and extended into the aluminum tube which forms a passage into the graphite moderator. In installations of the foregoing type, it may happen that the path through which the cable must operate will include numerous turns and bends and due to its low friction losses and light weight, this device permits rapid charge seating and a considerable saving of time.

In the charge seating application, illustrated in FIG. 5, the coiled conduit 18 provides sufficient friction with respect to the flexible cable 16 to prevent the latter from rotating about its own axis. Thus the pin 40 may be eliminated if desired. However, the pin 40 may also be utilized as a stop for limting the axial movement of the flexible cable 16 as when the pin 40 reaches the ends of the slot 18a in the conduit 18. While the slot 18a has been illustrated as extending substantially from end to end of the conduit 18, it will, of course, be understood that if it is desired to stop the flexible cable 16 at an intermediate location, the corresponding portion of the conduit 18 may be provided with a collar 47. The collar 47 extends around the conduit 18 and is adjustably secured thereto in any desired location as by a set screw 48. Of course, it will be apparent that more than one collar may be employed and that more than one pin 40 may likewise be employed, depending upon the control of movement desired for the connector 16a.

An alternative arrangement for controlling the position at which the connector 16a stops within the nuclear device is to make the inside diameter of the conduit 18 substantially larger than the outside diameter of the cable 16 so as to enable a collar, similar to collar 47, to be slipped over the cable 16 and secured thereto as by a set screw or other means, the outside diameter of the collar being sufficiently small to fit within the inside diameter of the conduit 18. With this arrangement, the cable 16 is permitted to advance into the passage of the nuclear device until the collar is stopped by the face of the ball nut housing 26.

It will further be apparent in FIG. 4 that a modification is illustrated in which the recirculating ball nut 25 has a tubular extension member 50 which is threaded at the end as at 51 and is adapted to grip by rotation and by a series of fingers 53 the flexible cable 16 shown generally at 52 which is adapted to grip by rotation and by a series of fingers 53 the flexible cable 16. The manner of operation of this chuck would be as follows. After the remote control actuator has seated a member, some clamping or unclamping operation may be desired. The motor is stopped, the chuck is engaged, the motor is restarted slowly or the chuck rotated by hand and instead of advancing or retracting the flexible cable 16, the cable will rotate through an angle to perform some further function, such as to pick up or release a load. At this point the chuck can be unclamped and the operation reversed. Suitable sealing means 55 are shown between the member 50 and the housing extension 56.

It will be apparent that the above examples of uses for the flexible force transmitting device or remote control mechanical actuator are not the only ones possible and that other arrangements may be utilized employing the basic concept of the present invention. For example, it is readily apparent that the power input may be applied in linear form to the flexible cable 16 or in rotary form to the recirculating ball nut 25. It will be further apparent that if the input force is rotational, the output force will be axial and vice-versa regardless of whether the nut 25 or the flexible cable 16 is driven. For some applications it may be desirable to anchor the cable 16 and to apply a linear input to the conduit 18, thus producing linear as well as rotary motions of the ball nut 25. In such arrangement the conduit 18 and the ball nut 25 will move together linearly but will have relative rotation.

From the foregoing, it will be seen that the present invention represents a substantial improvement over the prior art by enabling a force to be transmitted over a substantial distance from a remote location and through a circuitous path. It will further be seen that this is accomplished with a relatively lightweight device which is readily portable and has a low friction loss and low backlash.

While a preferred embodiment of this invention has been illustrated, it is to be understood that other modifications thereof may be made within the scope of the appended claims.

I claim:
1. A power transmission device comprising:
  a stationary support;
  an elongated flexible cable movably mounted on said support;
  said cable comprising a flexible core having a wire wound therearound with said wire being wrapped in the form of a helix on said core with the turns of the helix being spaced apart one from the other longitudinally of said core;
  a nut received over said cable;
  means rotatably mounting said nut on said support;
  a plurality of balls carried by said nut with said balls being operatively received in the spaces between the windings of said wire on said flexible core;
  recirculating means formed in said nut and operatively receiving said balls whereby movement of one of said cable and nut causes continuous circulation of said balls through said nut into the spaces between said windings on said cable and thereby movement of the other of said cable and nut.

2. The device of claim 1 and further including means associated with said nut adapted selectively to clamp said cable whereby said cable and nut are interconnected for unitary movement;
  said clamping means including radially movable jaws manually operable for engagement with said cable.

3. The device of claim 1 wherein said rotatable mounting means for said nut includes means restraining said nut from linear movement;
  means mounting said flexible cable on said support for linear movement through said rotatable nut; and
  gear means in operative engagement with said nut whereby the linear movement of said flexible cable imparts rotation to said gear means and vice versa.

4. The device of claim 3 wherein said means mounting said flexible cable includes means restraining rotation of said cable.

References Cited in the file of this patent
UNITED STATES PATENTS

| | | |
|---|---|---|
| 1,491,490 | Newton | Apr. 22, 1924 |
| 1,983,962 | Barber et al. | Dec. 11, 1934 |
| 2,346,728 | Carlson | Apr. 18, 1944 |
| 2,455,368 | Hoffar | Dec. 7, 1948 |
| 2,933,939 | Brandt | Apr. 26, 1960 |
| 2,953,934 | Sundt | Sept. 27, 1960 |
| 2,955,307 | Hunt | Oct. 11, 1960 |